March 9, 1965 W. A. THORNTON, JR 3,173,057
ELECTROLUMINESCENT COMBINATION
Filed May 9, 1961
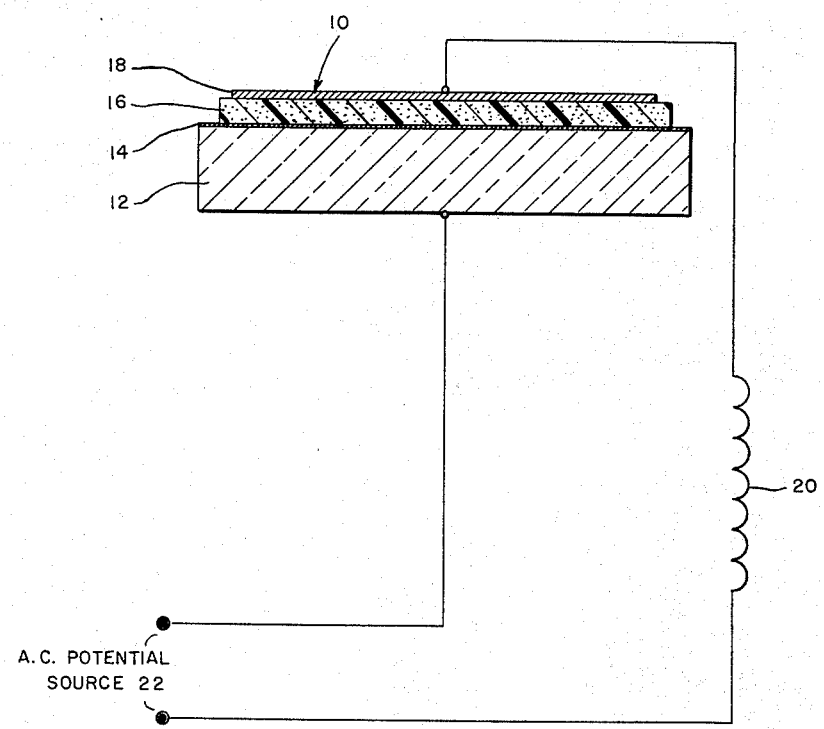
INVENTOR.
WILLIAM A. THORNTON, Jr.
BY
W. D. Palmer
ATTORNEY.

3,173,057
ELECTROLUMINESCENT COMBINATION
William A. Thornton, Jr., Cranford, N.J., assignor to Westinghouse Electric Corporation, East Pittsburgh, Pa., a corporation of Pennsylvania
Filed May 9, 1961, Ser. No. 108,944
4 Claims. (Cl. 315—244)

This invention relates to electroluminescence and, more particularly, to an electroluminescent device combination which displays a predetermined maintenance of initial light output throughout a prolonged period of operation.

The phenomenon of electroluminescence was first disclosed by G. Destriau, one of his earlier publications appearing in London, Edinburgh and Dublin Philosophical Magazine, series 7, volume 38, No. 285, pages 700–737 (October 1947). As with most types of light sources, the initial light output of electroluminescent devices drops considerably as the devices are operated, particularly if the initial output is at a relatively high level of intensity. Various means have been suggested for processing electroluminescent phosphors and for constructing electroluminescent devices, in order to improve this so-called maintenance of initial light output. While this maintenance has been improved to some degree, it would be very desirable to provide an electroluminescent device which has a very stable light output.

It is the general object of this invention to avoid and overcome the foregoing and other difficulties of and objections to prior-art practices by the provision of an electroluminescent device combination which displays a predetermined maintenance of initial light output throughout a prolonged period of operation.

It is a further object to provide an electroluminescent device combination which displays a stabilized light output throughout a prolonged period of operation.

The aforesaid objects of the invention, and other objects which will become apparent as the description proceeds, are achieved by providing an electroluminescent device combination wherein the electroluminescent device is connected in series with an inductor of predetermined fixed value. The electroluminescent device displays a capacitance which decreases as the device is operated, thereby increasing the capacitive reactance of the device. The initial capacitance of the electroluminescent device and the fixed series-connected inductance are so chosen with respect to one another that they form a series resonant circuit. This series resonant circuit is actuated by a potential source which is adapted to deliver a predetermined potential of predetermined frequency. When the device is initially operated, the components of the series resonant circuit have such relative values of resistance and reactance that the potential developed across the inductor differs by a predetermined amount from the potential developed across the electroluminescent device. During operation, the normal decrease in light output of the electroluminescent device portion of the series resonant circuit is modified by the change in effective energizing potential which is developed across the electroluminescent device, as the operation of the series resonant circuit is shifted with respect to a condition of resonance because of the decrease in capacitance of the electroluminescent device.

For a better understanding of the invention, reference should be had to the sole figure of the drawing which illustrates an electroluminescent device, shown in sectional elevational view, together with a series-connected inductor, with the series-connected electroluminescent device and inductor being connected across the terminals of an A.C. potential source.

With specific reference to the form of the invention illustrated in the drawing, the numeral 10 indicates generally an electroluminescent device which comprises a glass foundation 12 carrying thereon a light-transmitting, electrically conducting electrode layer 14. Over the layer 14 is carried a layer 16 comprising electroluminescent phosphor embedded in dielectric material and a second electrode 18 is carried over the phosphor-dielectric layer 16. The electrodes 14 and 18 are connected in series with an inductor 20, with these series-connected elements connected across a source 22 of A.C. energizing potential.

As a specific example, the device foundation 12 is fabricated of plate glass and the electrode layer 14 is fabricated of electrically conducting tin oxide. The phosphor portion of the layer 16 is formed of conventional copper activated zinc sulfide which is coactivated by chlorine. The electrode layer 18 is formed of vacuum metallized aluminum. The layer 16 has a thickness of one mil and comprises two parts by weight of the specified phosphor embedded in one part by weight of polyvinyl chloride plastic.

The foregoing electroluminescent device is subject to considerable modification. For example, a metallic foundation can be substituted for the glass foundation 12 and the phosphor can be embedded in a ceramic dielectric material rather than a plastic. The electrode layer 18 can be made light transmitting, if desired, and other light transmitting materials such as indium oxide can be substituted for the tin oxide as used in the layer 14. The thickness of the phosphor-dielectric layer 16 is subject to considerable variation and any electroluminescent phosphor can be used.

Considering a specific circuit arrangement, the device 10 has an illuminating area of 200 square feet and is intended to be operated initially with an excitation potential of 120 volts, 60 c.p.s. The capacitance of such a device is approximately 50 microfarads, with the capacitive reactance being approximately 50 ohms. The resistance of such a device is approximately 300 ohms and this resistance and capacitive reactance can be represented as connected in parallel. The parallel-connected resistance and reactance can also be expressed as an equivalent series circuit, wherein 8 ohms of resistance are connected in series with 50 ohms of capacitive reactance.

In order to obtain a stabilized light output throughout a prolonged period of operation, the inductive reactance of the inductor 20 should exceed by a predetermined amount the initial capacitive reactance of the electroluminescent device 10. As a result, the initial current through the electroluminescent-inductor series resonant circuit lags the voltage applied thereacross by a predetermined amount so that an increase in capacitive reactance of the electroluminescent device 10 will shift the series resonant circuit toward a condition of resonance. For the foregoing circuit, the inductor 20 is chosen to introduce inductive reactance in amount of approximately 70 ohms. At the indicated operating frequency, this inductor can comprise 1,000 ft. of 40 mil copper wire, wound in a coil which is 10 inches in diameter. Such a coil will have a resistance of 6 ohms. The series-connected circuit can be expressed as 50 ohms of capacitive reactance (the electroluminescent device), 14 ohms of resistance (the combined resistance of the electroluminescent device and the inductor) and 70 ohms of inductive reactance. The "Q" of this circuit is approximately 4. When such a circuit is initially operated by applying a potential of 50 volts across the input terminals of this series resonant circuit, approximately 120 volts will be developed across the electrodes 14 and 18 of the electroluminescent device 10.

During operation, the capacitive reactance and the resistance of this device 10 both increase approximately in proportion to one another. For the specific cell as described, throughout a desired, rated life of approximately $10^9$ cycles of operation (equivalent to 4500 hours of operation at 60 c.p.s.), both the device capacitive reactance and the device resistance increase by about 20%. As noted, the initial value of capacitive reactance for the device 10 is approximately 50 ohms and this will increase throughout life to approximately 60 ohms. Likewise, the resistance of the electroluminescent device will increase from about 8 ohms to about 10 ohms. The resulting series-connected circuit can now be expressed as 60 ohms of capacitive reactance (the electroluminescent device), 16 ohms of resistance (the combined resistance of the electroluminescent device and the inductor) and 70 ohms of inductive reactance, with the latter value being fixed. This results in increasing the potential which is developed across the electroluminescent device 10 to approximately 187 volts, as the series resonant circuit shifts its operation toward a condition of resonance. The gradual increase in capacitive reactance for the device 10 generally corresponds to the gradual decrease in the initial light output of this device as it is operated. As a result, the gradual increase in potential developed across the electroluminescent device 10 offsets the normal gradual decrease in initial brightness of this device.

Electroluminescent phosphors display varying performance characteristics with respect to the so-called slope of the voltage-brightness curve. In explanation, some phosphors display a rapidly increasing brightness when an increasing voltage is applied across the device incorporating the phosphor; such devices are said to have a steep slope of voltage-brightness. Other phosphors, in contrast, when incorporated into an electroluminescent device will display a relatively low slope of voltage-brightness. If the phosphor has a relatively steep slope of voltage-brightness, it is necessary to lower the "Q" of the series resonant circuit by adding more series resistance, in order to maintain the light output substantially constant. In such a case, additional resistance in amount of 14 ohms, for example, can be added to the foregoing series resonant circuit, thereby providing a total resistance of 28 ohms at the time of initial operation. With other values remaining the same, 57 volts can be applied across the terminals of the series resonant circuit and this will develop 120 volts across the electrodes 14 and 18 of the device 10. During operation, this developed voltage will gradually rise to approximately 150 volts, or an increase in 30 volts, as the operation of the series resonant circuit shifts toward a condition of resonance.

As a second example of a specific circuit arrangement, assume that the device 10, as shown in FIG. 1, has an illuminating area of 200 square feet and is intended to be operated with an initial excitation potential of 120 volts, 400 c.p.s. In such case, the capacitive reactance of the device is 8 ohms and the resistance is 80 ohms. The equivalent series circuit for these parallel resistance and reactance values can be expressed as 0.8 ohm resistance in series with 8 ohms capacitive reactance. For operation at a steep portion of the resonance curve, an inductor having an inductive reactance of approximately 10 ohms, formed of about 150 ft. of 40 mil copper wire wound in a coil of 10 inches diameter, can be placed in series with the electroluminescent device. This coil has a resistance of approximately 1 ohm. The equivalent circuit can thus be expressed as 8 ohms of capacitive reactance (the electroluminescent device), approximately 2 ohms of resistance (combined resistance of the electroluminescent device and the inductor) and 10 ohms of inductive reactance. The "Q" of this circuit is approximately 4 and if a potential of 38 volts is applied across the input terminals of the series circuit, approximately 120 volts will be developed across the electroluminescent device.

Assume that the desired period for stabilized output for the last specified electroluminescent device will result in a twelve percent increase for both the capacitive reactance and resistance. In such case, the capacitive reactance for the electroluminescent device will increase from 8 ohms to 9 ohms and the resistance of the device will increase from 0.8 ohm to 0.9 ohm. At the end of rated life, the capacitive reactance of the circuit will be 9 ohms, the series resistance will be approximately 2 ohms and the inductive reactance will be approximately 10 ohms. The "Q" of such circuit is approximately 4 and if 38 volts are applied across the terminals of the circuit, as indicated hereinbefore, the potential developed across the lamp at the end of rated life will be approximately 150 volts.

In some cases it may be desirable to decrease the "Q" of the last specified series resonant circuit example by adding resistance. This is particularly true when the electroluminescent device has been so processed as to display a somewhat improved maintenance over that which is usually realized. As disclosed in copending application S.N. 58,979, filed September 28, 1960, by Thornton, and owned by the present assignee, electroluminescent phosphor may be further processed after initial preparation by baking in an atmosphere comprising oxygen. If the device which is desired to be incorporated into the immediately preceding resonant circuit example incorporates phosphor which has been initially processed by such a baking procedure, and it is desired to detune the series resonant circuit to compensate for the improved maintenance, 6 ohms of additional series resistance can be added. If 111 volts are applied across the input terminals of this modified series circuit, on initial energization 120 volts will be developed across the electroluminescent device, rising to 138 volts during life.

In the foregoing specific circuit arrangements, the increase in resistance as well as capacitance during operation of the electroluminescent devices has been considered, since the usual electroluminescent device displays such increased resistance. It should be understood, however, that the only effect of this slight increase in resistance is slightly to lower the "Q" of the series resonant circuit. If an electroluminescent device could be fabricated which had a constant resistance thoughtout operation, or even a slightly decreasing resistance, this would not affect the basic operating characteristics of the present series resonant circuit, which are dependent upon the gradually decreasing capacitance of the electroluminescent device, taken in conjunction with a fixed inductance.

The use of a series resonant circuit for operation of an electroluminescent device has additional advantages in that this circuit can replace a transformer, in order to develop a greater-than-line voltage across the electroluminescent device. In addition, by selecting the relative values of inductance and capacitance, as well as the additional series resistance, the operating characteristics of the electroluminescent device can be varied as required by the application. For most purposes a stabilized light output throughout a prolonged period of operation is desirable. For some applications, however, a rising light output or even a light output which decreases at a greater-than-normal rate may be desired. Such operating characteristics can readily be achieved by preselecting the portion of the series resonant curve throughout which the electroluminescent device will operate. In addition, the "Q" of the series resonant circuit can be readily modified, as indicated by the desired operating characteristics for the electroluminescent device.

It will be recognized that the objects of the invention have been achieved by providing an electroluminescent device combination which displays a predetermined maintenance of initial light output throughout prolonged period of operation. This device combination can be so designed that the electroluminescent portion thereof displays a stabilized light output throughout a prolonged period of operation.

Wherein best examples have been illustrated and described in detail, it is to be particularly understood that the invention is not limited thereto or thereby.

I claim:

1. An electroluminescent device combination which displays a light output of predetermined maintenance characteristics throughout a prolonged period of operation, said combination comprising: electroluminescent means operable to produce light when an alternating potential is applied thereto and also possessing inherent capacitance of predetermined value which decreases in value during operation, and said electroluminescent means displaying a light output which decreases during normal operation under energization by a constant alternating potential; inductor and resistance means of predetermined value connected in series with said electroluminescent means; a series circuit, having a predetermined value of "Q," formed by said electroluminescent means and said series-connected inductor and resistance means; potential source means adapted to deliver a predetermined potential of predetermined frequency and connected across said series circuit; and the said means comprising said series circuit having such relative values of resistance and reactance that when initially energized by said potential source means, the potential developed across said inductor and resistor means differs by a predetermined amount from the potential developed across said electroluminescent means, and during operation the normal decrease in light output from said electroluminescent means is modified in predetermined fashion by the change in effective energizing potential developed thereacross as the operation of said series circuit is shifted with respect to a condition of resonance.

2. An electroluminescent device combination which displays a stabilized light output throughout a prolonged period of operation, said combination comprising: electroluminescent means operable to produce light when an alternating potential is applied thereto and also possessing inherent capacitance of predetermined value which decreases in value during operation, and said electroluminescent means displaying a light output which decreases during normal operation under energization by a constant alternating potential; fixed inductor and resistance means of predetermined value connected in series with said electroluminescent means; a series circuit, having a predetermined value of "Q," formed by said electroluminescent means and said series-connected fixed inductor and resistance means; potential source means adapted to deliver a predetermined potential of predetermined frequency and connected across said series circuit; and the said means comprising and series circuit having such relative values of resistance and reactance that when initially energized by said potential source means, the potential developed across said inductor and resistance means is greater by a predetermined amount than the potential developed across said electroluminescent means, and during operation the normal decrease in light output from said electroluminescent means is substantially offset by the increase in effective energizing potential developed thereacross as the operation of said series circuit shifts toward a condition of resonance.

3. An electroluminescent device combination which displays a stabilized light output throughout a prolonged period of operation, said combination comprising: electroluminescent means operable to produce light when an alternating potential is applied thereto and also possessing inherent capacitance of predetermined value which gradually decreases in value during operation and inherent resistance of predetermined value which gradually increases in value during operation, and said electroluminescent means displaying a light output which gradually decreases during normal operation under energization by a constant alternating potential; fixed inductor means and resistance means of predetermined values connected in series with said electroluminescent means; a series circuit, having a predetemined value of "Q," formed by said electroluminescent means and said series-connected fixed inductor means and resistance means; potential source means adapted to deliver a predetemined potential of predetermined frequency and connected across said series circuit; and the said means comprising said series circuit having such relative values of resistance and reactance that when initially energized by said potential source means, the inductive reactance of said inductor means is greater by a predetermined amount than the initial capacitive reactance of said electroluminescent means, and during operation the normal gradual decrease in light output from said electroluminescent means is substantially offset by the gradual increase in effective energizing potential developed thereacross as the operation of said series circuit shifts toward a condition of resonance.

4. The method of obtaining a substantially uniform light output from an electroluminescent device throughout a prolonged period of operation, which method comprises:
 (a) forming a series circuit by connecting said electroluminescent device in series with an inductance of predetermined value and a resistance of predetermined value;
 (b) connecting said series circuit across a source of alternating potential of predetermined uniform magnitude and having a predetermined frequency to energize said device to light emission, with the potential drop across said device being less by a predetermined amount than the combined potential drop across said inductance and said resistance; and
 (c) continuing to energize said device to light emission for a prolonged period of time to cause the potential drop across said device to increase a predetermined amount; whereby the normal operational drop in light output from said device is offset by the increased electric potential applied thereacross.

References Cited in the file of this patent
UNITED STATES PATENTS

| 2,813,229 | Sacks | Nov. 12, 1957 |
| 2,836,766 | Halsted | May 27, 1958 |

FOREIGN PATENTS

| 1,133,387 | France | Nov. 19, 1956 |

Notice of Adverse Decision in Interference

In Interference No. 95,086 involving Patent No. 3,173,057, W. A. Thornton, Jr., ELECTROLUMINESCENT COMBINATION, final judgment adverse to the patentee was rendered May 31, 1968, as to claim 1.
[*Official Gazette October 29, 1968.*]